US007516683B2

(12) United States Patent
Jasseron

(10) Patent No.: US 7,516,683 B2
(45) Date of Patent: Apr. 14, 2009

(54) COLLAPSIBLE PEDAL BOX

(75) Inventor: Marc Jasseron, Birmingham (GB)

(73) Assignee: Dura Global Technologies, Inc., Rochester Hills, MI (US)

(*) Notice: Subject to any disclaimer, the term of this patent is extended or adjusted under 35 U.S.C. 154(b) by 160 days.

(21) Appl. No.: 10/515,681

(22) PCT Filed: Mar. 31, 2003

(86) PCT No.: PCT/GB03/01398

§ 371 (c)(1),
(2), (4) Date: Mar. 31, 2005

(87) PCT Pub. No.: WO03/101787

PCT Pub. Date: Dec. 11, 2003

(65) Prior Publication Data

US 2005/0247157 A1 Nov. 10, 2005

(30) Foreign Application Priority Data

May 29, 2002 (GB) ................................. 0212263.8

(51) Int. Cl.
G05G 1/14 (2006.01)
B60K 28/10 (2006.01)
(52) U.S. Cl. ............................. 74/512; 74/513; 74/560; 180/274
(58) Field of Classification Search ........... 74/512–514, 74/560; 180/315, 274; G05G 1/14; B60K 28/10
See application file for complete search history.

(56) References Cited

U.S. PATENT DOCUMENTS 6,360,629 B2 * 3/2002 Schambre et al. ............. 74/512
6,367,349 B1 * 4/2002 Allen et al. ................... 74/512
6,499,376 B2 * 12/2002 Thistleton et al. ............. 74/512
6,920,955 B2 * 7/2005 Chamberlin ................ 180/315
7,066,048 B2 * 6/2006 Sauvonnet et al. ............ 74/512

(Continued)

FOREIGN PATENT DOCUMENTS

EP 0 827 874 A2 3/1998

(Continued)

Primary Examiner—Vinh T. Luong
(74) Attorney, Agent, or Firm—Gifford, Krass, Sprinkle, Anderson & Citkowski, P.C.

(57) ABSTRACT

A pedal box for an automobile is designed to collapse in the event of a front-end vehicle collision. A pedal box supports a control pedal of the automobile. The pedal is pivotally mounted on a main pivot shaft which goes through a preferably arcuate elongate slot in the pedal. The main pivot shaft is normally held at one end of the slot by a blocking plate which is held between a pivotal access below the slot and a latch member above the slot. In the case of a frontal impact of the automobile causing entry of the pedal box into the driver's compartment, a relatively rigid member of the automobile contacts the latch member and releases the latching engagement, permitting the blocking plate to fall away and allowing the main pivot shaft to traverse a slot in the pedal together with rotation of the pedal away from contact with the feet of a driver of the automobile. Although the pedal collapses and moves away from the driver's feet, its pivotable mounting is still maintained, so that some element of emergency control can still be established should the automobile still be drivable.

9 Claims, 12 Drawing Sheets

U.S. PATENT DOCUMENTS

| | | | |
|---|---|---|---|
| 7,077,028 B2 * | 7/2006 | Misonou et al. | 74/512 |
| 7,267,194 B2 * | 9/2007 | Miyoshi | 180/274 |
| 7,434,648 B2 * | 10/2008 | Hayashi | 180/274 |
| 2002/0020248 A1 * | 2/2002 | Miyoshi et al. | 74/512 |
| 2003/0019319 A1 * | 1/2003 | Mizuma | 74/560 |

FOREIGN PATENT DOCUMENTS

| | | |
|---|---|---|
| EP | 0 827 885 A | 3/1998 |
| EP | 1 038 720 A | 9/2000 |
| EP | 1 134 128 A | 9/2001 |
| EP | 1 179 461 A | 2/2002 |
| GB | 2 353 009 | 2/2001 |
| WO | WO 02/30718 A1 | 4/2002 |

* cited by examiner

COLLAPSIBLE PEDAL BOX

FIELD OF THE INVENTION

This invention relates to pedal boxes for automobiles, and to structures which are designed to collapse in the event of a front-end vehicle collision.

BACKGROUND OF THE INVENTION

The improved design of safety shell structures around the driving compartment of a motor vehicle, and the improvements in the shock absorbing characteristics of engine compartments, have meant that it is now much less likely that the driver of a vehicle in a front-end collision will be killed outright. With that increase in vehicle safety comes another concern, which is that the driver whose life has been spared by good vehicle design should not become injured or trapped in the vehicle by the pedal box structure around the driver's feet.

Brake and clutch pedal boxes have been proposed which collapse on application of an excessive load such as that applied by the forward momentum of a driver when the vehicle is in a front-end collision. A collapse of the pedal box in such a situation permits the pedals of the vehicle to move forward and away from the driver's feet, providing important extra legroom to reduce the risk of the driver's feet becoming trapped in the accident. Even a few centimeters of extra legroom in such circumstances can be a significant safety advantage.

Various prior proposals for collapsible pedal box design have contemplated making the pedal box collapse dependent on the impact itself. It is however important to reduce as much as possible the extent to which the reaction pressure of the driver's foot on the pedal or pedals is necessary to initiate pedal box collapse. Similarly it is important to reduce as much as possible the reliance on any other member which might come into contact with the driver, such as a steering column member, as a source of the reaction pressure.

A collapsible pedal box has previously been described in EP 0827874. The pivot shaft is journalled between pivot shaft supports which are permanently mounted on the inner surface of the opposing side walls. In the event of a frontal impact, a member in the passenger compartment collides with the front of the two side walls forcing them apart while on the engine side the side plates are brought together. Accordingly, the two pivot shaft supports are forced apart to release the pivot shaft. However, since the two side walls twist in opposite directions during the impact, the two pivot shafts are unable to move mutually apart along the axis of the pivot shaft and so there is a greater likelihood that the pivot shaft will still be retained by one of the supports after impact.

Another collapsible pedal box has been described in our WO-A-02/30718. A pivot shaft for the pedal or pedals is journalled at its ends in discrete pivot shaft supports which are physically locked with respect to side walls of the pedal box until there is a front-end impact of the vehicles. Then the pivot shaft supports are unlocked so that they can move mutually apart along the axis of the pivot shaft, to release the pivot shaft and initiate collapse of the one or more pedals.

Both of the above prior proposals require that end supports for the pivot shaft move apart in mutually opposite directions. In the case of a particularly violent front end collision the pivot shaft itself may be bent, which could resist the movement apart of the two end supports. It is therefore an object of the invention to create a collapsible pedal box in which the pedal box collapse is initiated without requiring axial movement apart of opposite end supports of the pivot shaft in mutually opposite directions.

SUMMARY OF THE INVENTION

The invention provides a pedal box incorporating a control pedal of an automobile, wherein the pedal is pivotally mounted on a main pivot shaft which passes through an elongate slot in the pedal, the main pivot shaft being normally held at one end of the slot by a blocking plate which is held in position by a latch member, wherein when the pedal box is mounted in an automobile, relative movement between the pedal box and another member of the automobile in the case of a frontal impact causes the latch member to release the blocking plate, permitting the blocking plate to fall away and causing or allowing the main pivot shaft to traverse the slot in the pedal together with rotation of the pedal away from contact with the feet of a driver of the automobile.

The blocking plate preferably is itself pivotally mounted on the pedal, with a pivotal axis on one side of the elongate slot and the latching engagement with the latch member on the other side of the elongate slot. When the latching engagement is released, the blocking plate therefore falls away in a pivotal movement about its pivotal axis. Preferably the latching engagement between the blocking plate and the latch member is maintained by either a spring member or a shear pin. In the case of a spring member maintaining the engagement, the spring force should be such that it is readily overcome by the forces present in a typical vehicle frontal impact of the kind envisaged for initiating the collapse of the pedal box. If the engagement is maintained by a shear pin, then the shear force necessary to fracture the pin is similarly a force typical of the vehicle frontal impact of the kind envisaged for initiating collapse of the pedal box. Typically the spring member or the shear pin would be provided at a location to prevent rotation of the latch member in a sense to release the latching engagement with the blocking plate. When the spring force is overcome or the shear pin is broken by the force of the vehicle frontal impact, the latch member rotates out of latching engagement with the blocking plate, the blocking plate falls away, and the pedal moves to a collapsed position with the main pivot shaft occupying the other end of the elongated slot.

The blocking plate when held in position by the latch member may abut the main pivot shaft to hold it at the said one end of the slot, in which case when the blocking plate falls away it releases the main pivot shaft and allows it to traverse the elongate slot in the pedal. Alternatively the blocking plate may have a through-hole formed therein, acting as a journal for the main pivot shaft. In such an arrangement when the blocking plate falls away it carries the main pivot shaft with it, causing the main pivot shaft to traverse the elongate slot in the pedal.

The elongate slot may be linear or arcuate. Preferably the pedal during normal movement presses on an output member through a clevis pin, and on collapse the pedal rotates around that clevis pin to move it away from contact with the driver's foot.

The extent of collapse is dictated by the length of the elongate slot. That may be designed so that even after a crash and pedal box collapse, the pedal can still exert some control function even though it does not travel its normal range of movement.

The pedal box may carry more than one pedal, and in such a case each pedal may be provided with a similar elongate slot, blocking plate and latch member for effecting pedal box collapse on a pedal-by-pedal basis.

The invention lends itself particularly to the use of two-part pedals in which a fulcrum portion provides the elongate slot, the mounting for the blocking plate and the axis for the clevis pin output to an output member; and a lever portion depends from the fulcrum portion for engagement by the driver's foot. Such a two-part pedal, which is very conveniently made from cut sections of an extruded aluminium alloy, can be designed with an adjustable connection between the fulcrum and lever portions. Preferably the fulcrum portion includes a track in which the lever portion is slidable, and by changing the position of the lever portion in the track the effective position of the foot-engaging portion of the pedal can be varied to adjust to the different leg lengths of different drivers. That adjustment may be varied by turning a lead screw to crank the lever portion along the length of the track, and if desired the lead screw can be turned mechanically from a remote location by a flexible shaft. The flexible shaft may be hand-turned or turned by a motor as a means of obtaining the pedal adjustment most suitable for an individual driver.

DETAILED DESCRIPTION OF THE PREFERRED EMBODIMENTS

Figure 1:
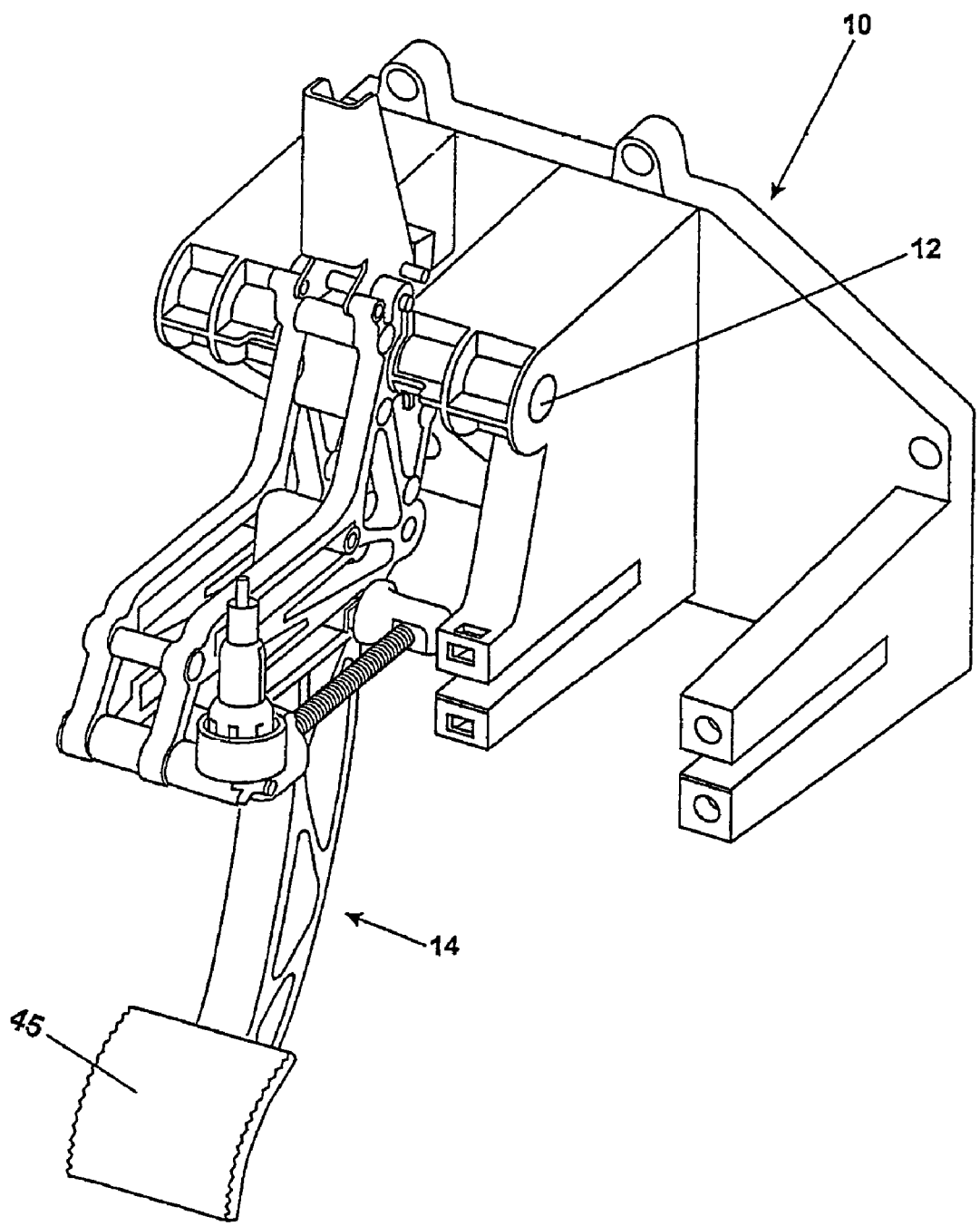
FIG. 1 is a perspective view of a pedal box according to the invention, mounting a single brake pedal of an automobile.
Figure 2:
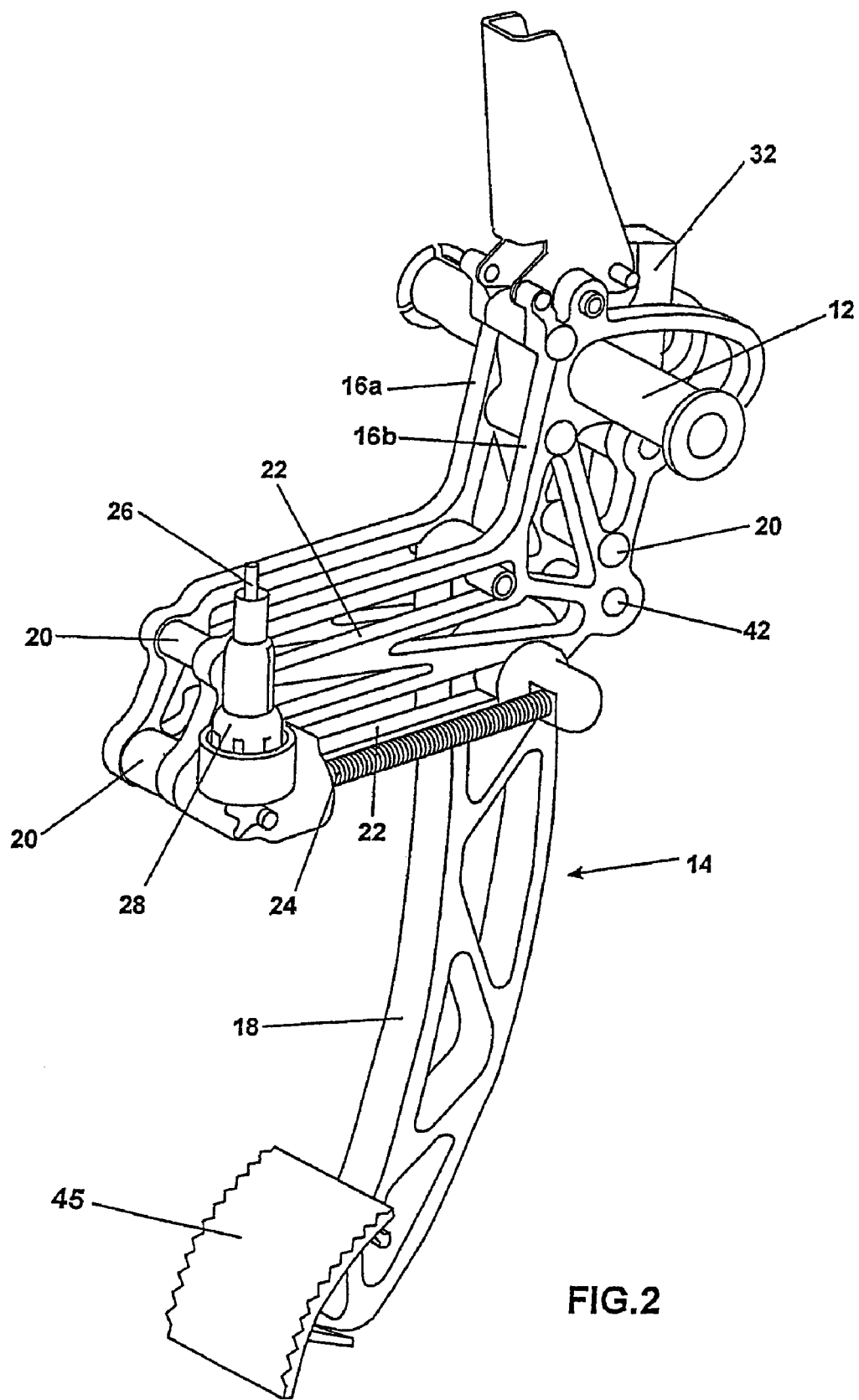
FIG. 2 is a detail showing the pedal and main pivot shaft only of FIG. 1.

FIG. 1 shows a main pedal box support structure 10 providing a fixed mounting for a main pivot shaft 12 for a brake pedal 14 of an automobile. The pedal 14 is a two-part pedal. It comprises a fulcrum portion 16 and a lever portion 18. The fulcrum portion 16 comprises two skeletal side plates 16a and 16b connected together in mutually spaced relationship by connecting rivets and spacers 20. Particularly the skeletal side plates are formed by cutting slices from a continuous extrusion of an aluminium alloy. Depending from between the skeletal side plates 16a and 16b is the lever portion 18. The lever portion 18 can slide forward and backwards in two parallel tracks 22 in each skeletal side plate, the forward and rearward motion being controlled by rotation of a lever screw 24 which is turned by a flexible drive shaft 26 acting through a gear box 28. In the relative positions shown in FIG. 2, the lever portion 18 is positioned at the end of the tracks 22 most distant from the driver of the automobile, in a configuration suitable for a long-legged driver. By rotation of the screw 24 the lever portion 18 can be drawn towards the driver, to accommodate drivers with shorter legs.

Figure 3:
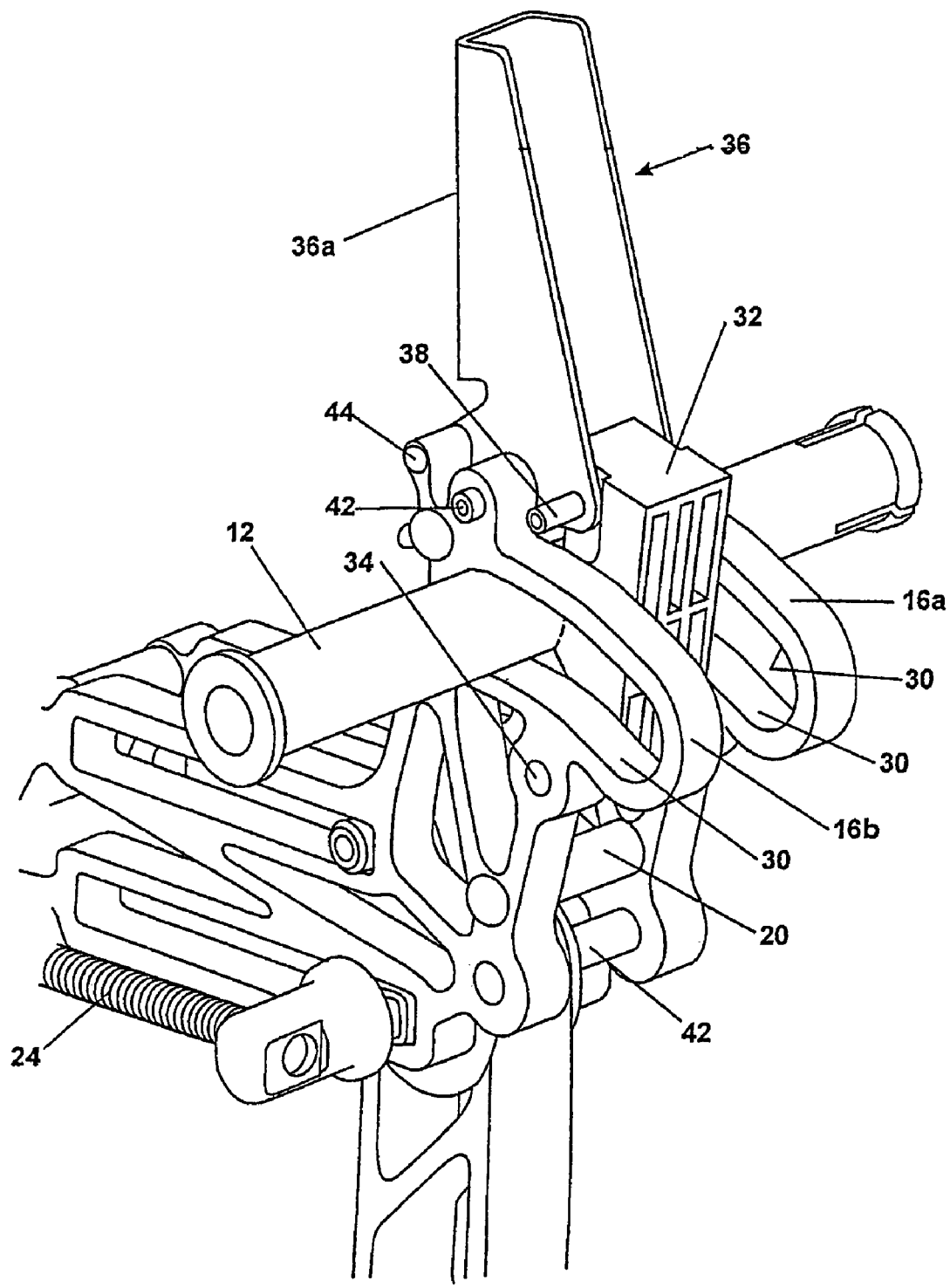
FIG. 3 is an enlarged detail of the pivotal mounting of the pedal on the main pedal shaft of FIG. 2, viewed from behind the pedal.

FIGS. 3-8 illustrate the collapsible mounting of the pedal on the main pivot shaft 12. The pivot shaft 12 passes through a pair of aligned arcuate elongate slots 30 in the respective side plates 16a and 16b of the fulcrum portion 16. As shown in FIG. 3, the main pivot shaft 12 is normally held at the left hand end of the aligned arcuate slots 30 by a blocking plate 32. The blocking plate 32 lies between the two side portions 16a and 16b of the fulcrum portion 16 of the brake pedal 14, and is mounted by a pivot pin 34 below the arcuate slots 30 and a latch member 36 above the arcuate slots 30. The latch member 36 carries a detent pin 38 which normally engages in a hooked recess 40 in the blocking plate 32, although that hooked recess 40 is not visible in FIG. 3 of the drawings and can only be seen in FIGS. 6 and 7.

The latch member 36 is pivotally mounted between the side plates 16a and 16b of the fulcrum portion 16 of the brake pedal by a pivot pin 42. A shear pin 44 normally prevents the latch member 36 from rotation about the pivot pin 42, and holds the detent pin 38 in the hooked recess 40.

Figure 4:
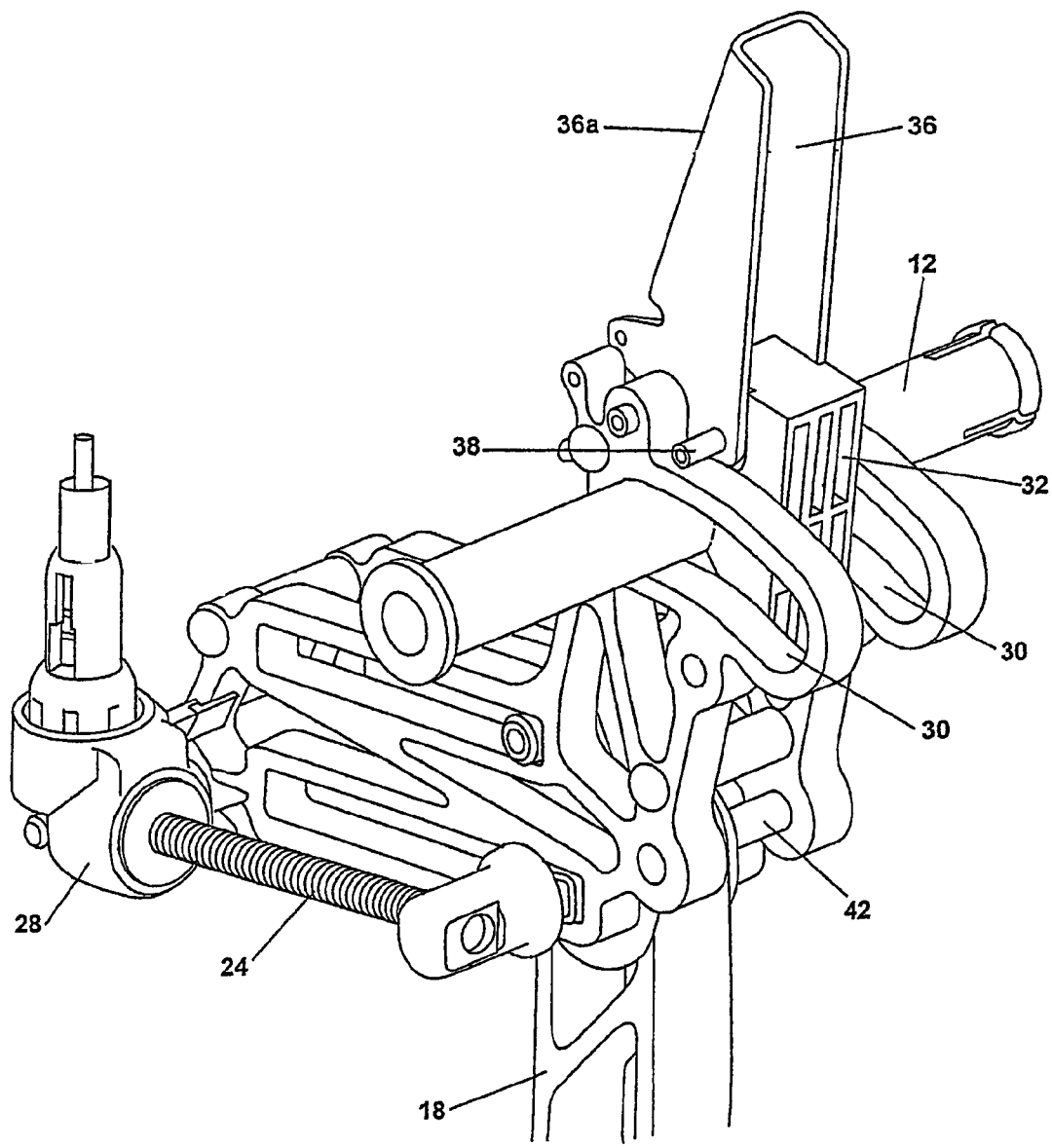
FIG. 4 is a view similar to that of FIG. 3 but showing the first stage of pedal collapse.
Figure 5:
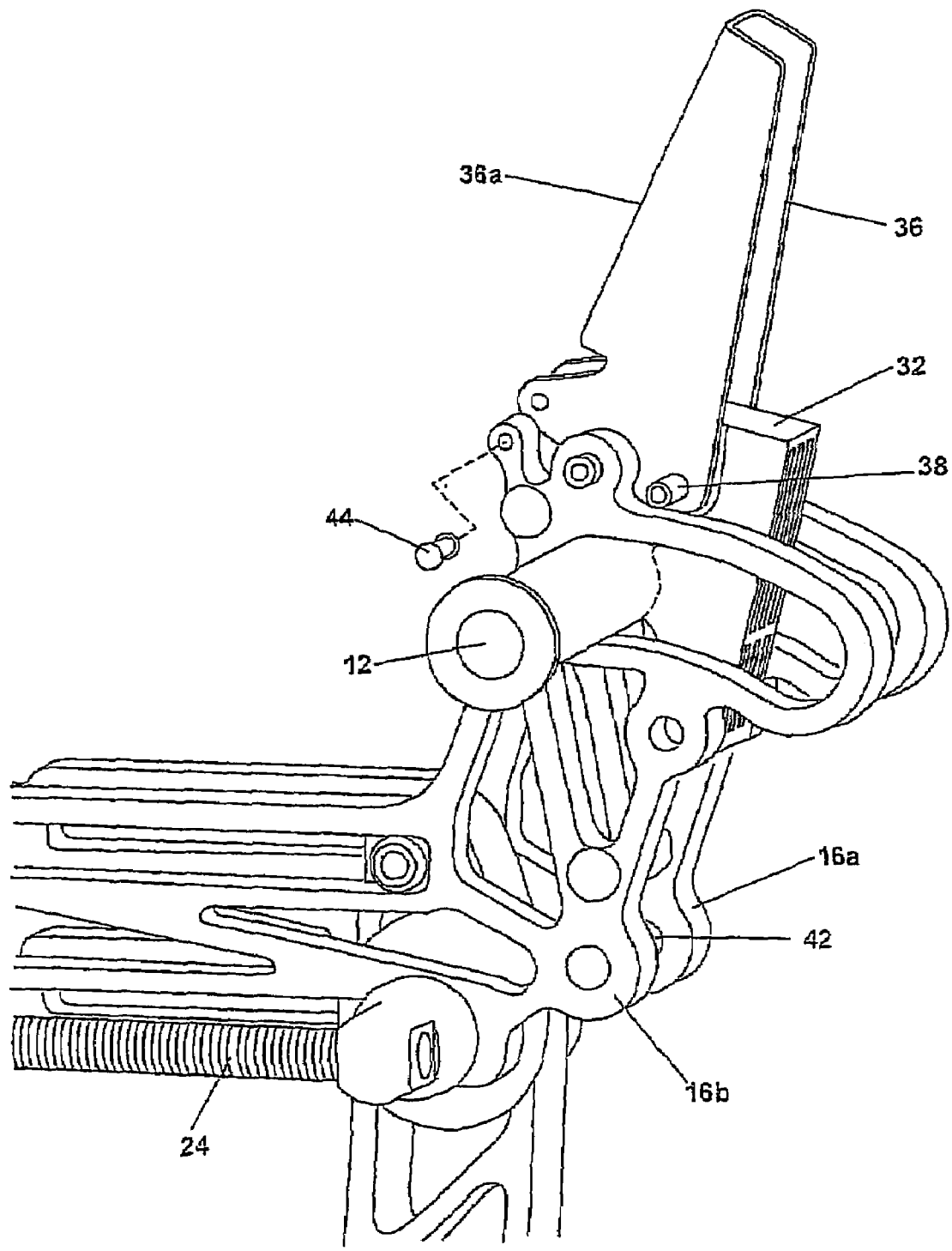
FIG. 5 is an explanatory view similar to that of Figure but from a slightly different angle.
Figure 6:
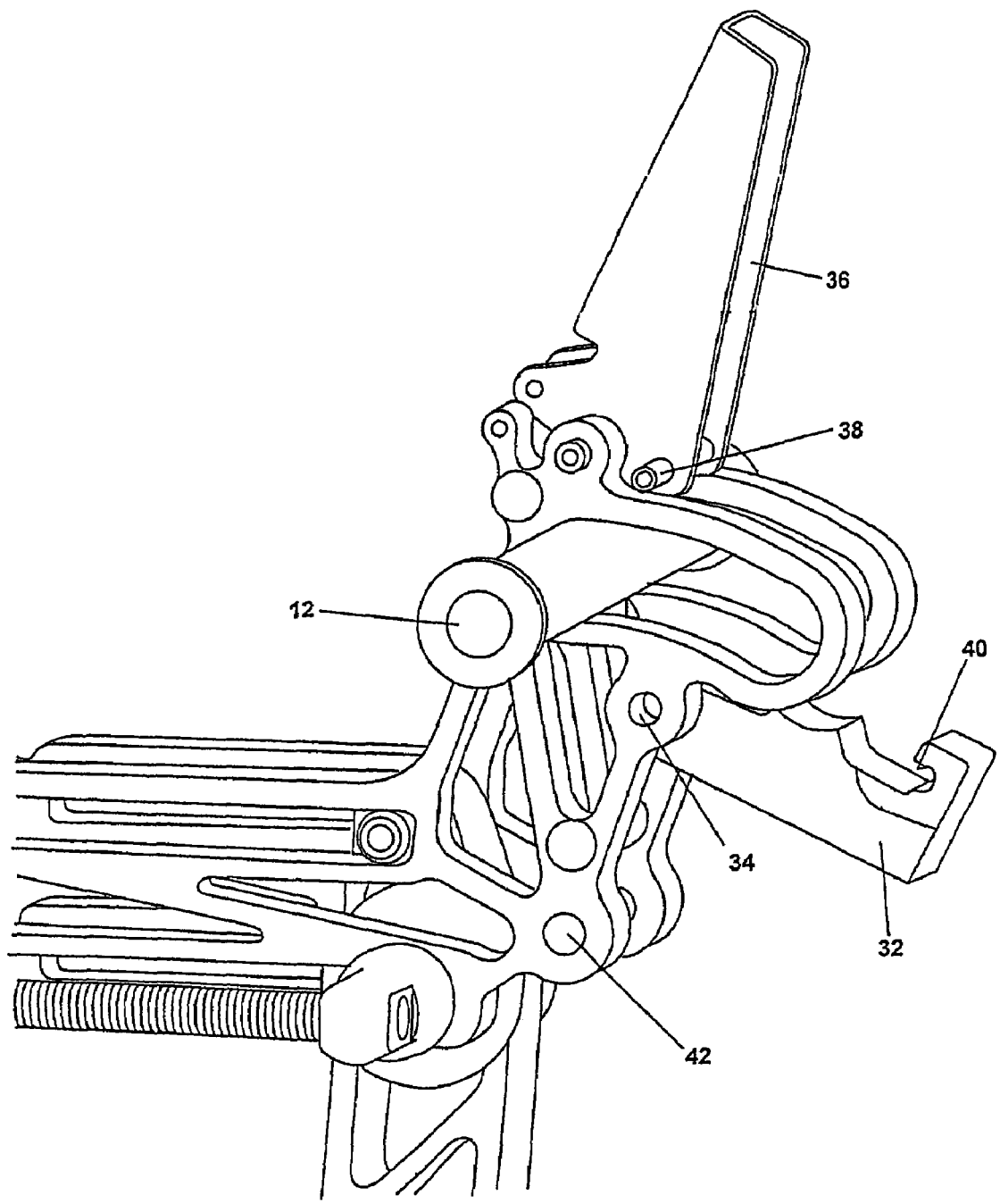
FIG. 6 is a view from the same angle as FIG. 5, but showing the next stage in the process of collapse.
Figure 7:
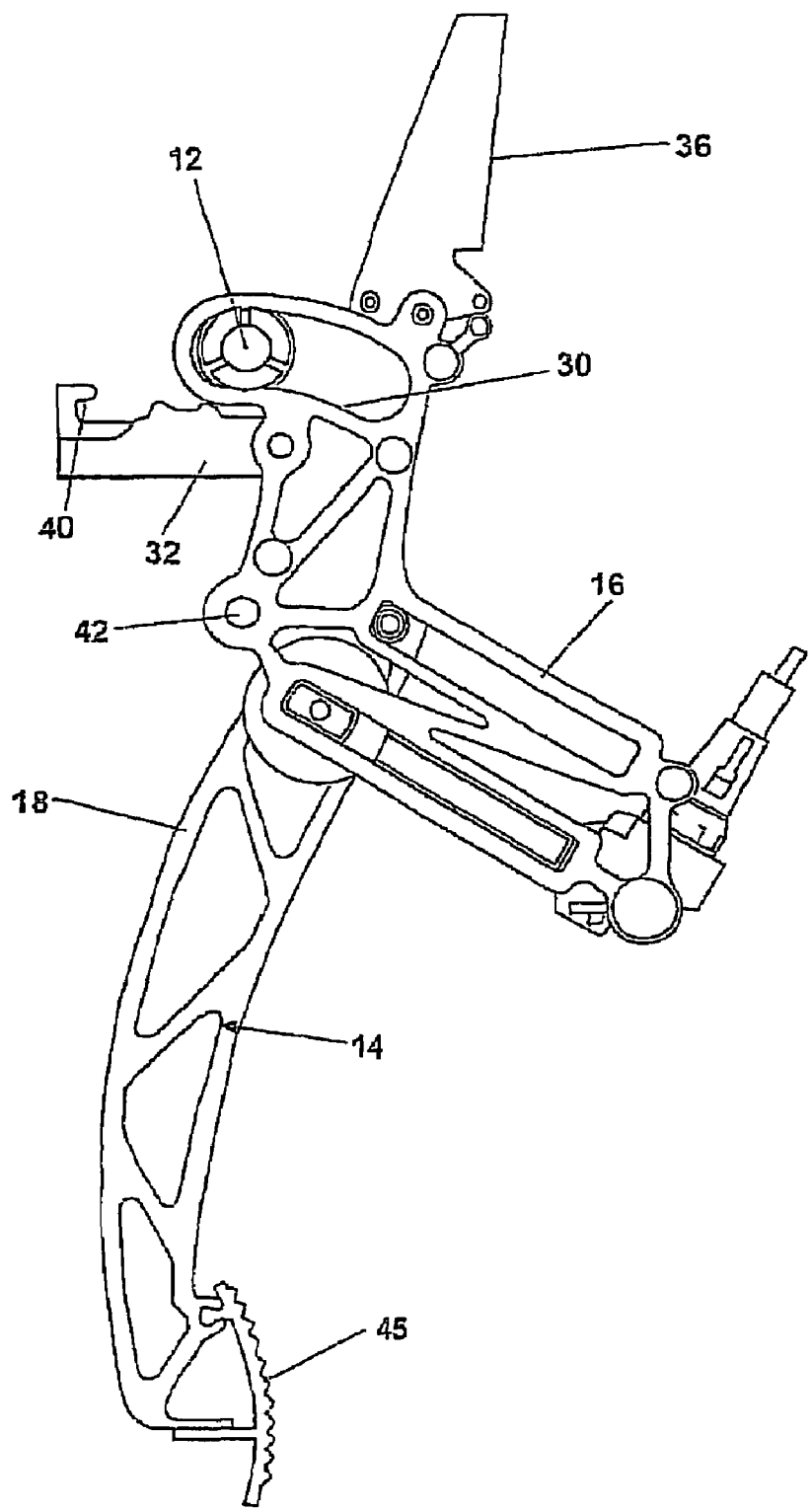
FIG. 7 is a side elevation taken from the opposite side of the pedal as that of FIG. 6, showing the final stage of pedal collapse.

In the case of a front-end collision of the vehicle, the entire pedal box mounting 10 is pushed rearwardly into the driver's compartment of the vehicle. Always the vehicle design includes a relatively rigid member in the driver's compartment, such as a bracket (not shown) supporting a steering column of the automobile. The latch member 36 includes an upstanding portion 36a which strikes relatively rigid member of the driver's compartment in the case of a severe front end vehicle collision, and the first consequence of that impact is the fracture of the shear pin 44 as illustrated in FIGS. 4 and 5, and the rotation of the latch member about its pivot pin 42, in the clockwise direction as viewed in FIGS. 4 and 5. That rotation of the latch member 36 moves the detent pin 38 out of engagement with the hook recess 40 of the blocking plate 32, permitting the blocking plate 32 to pivot out its pivot pin 34 to the position shown in FIG. 6.

Figure 8:
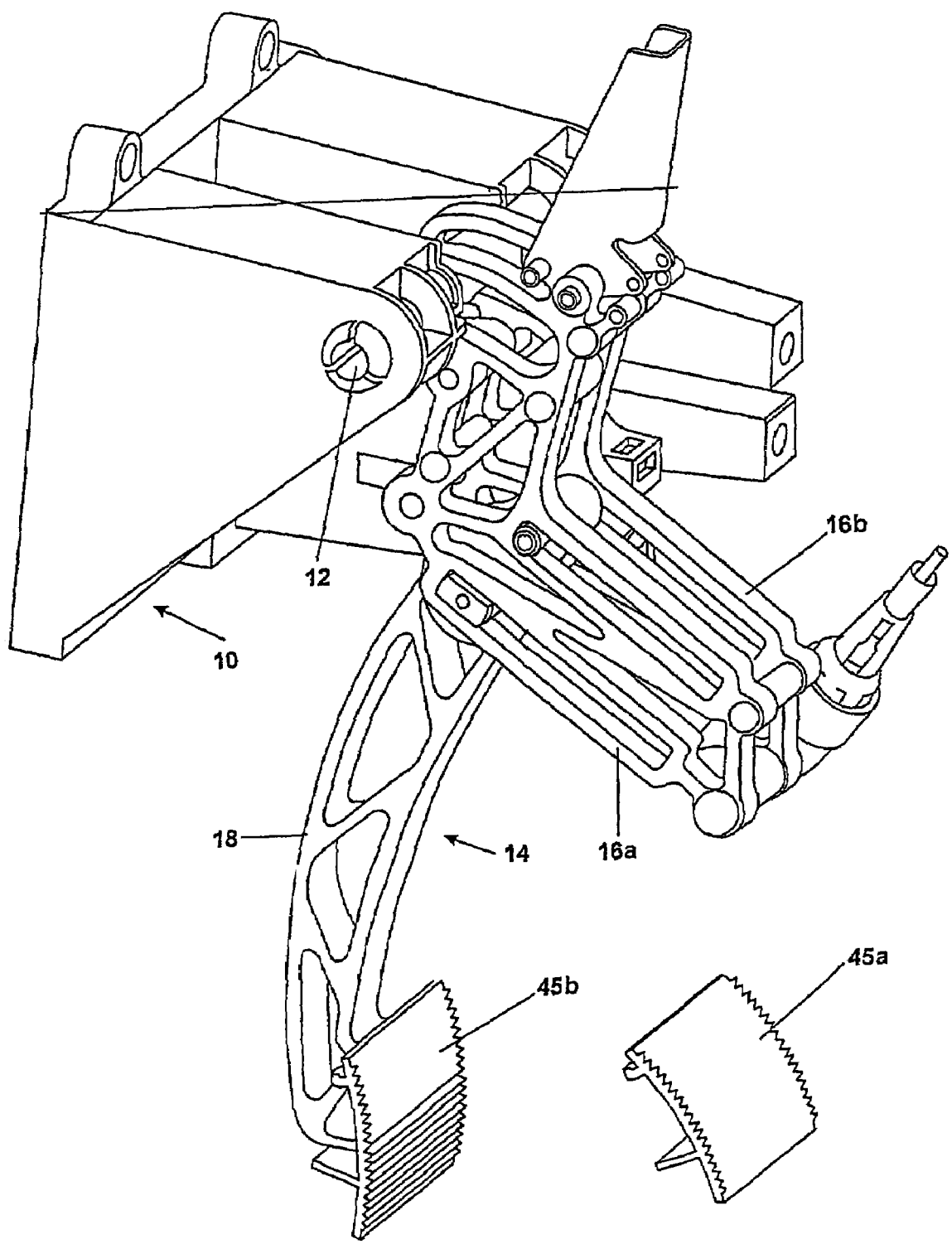
FIG. 8 is a perspective view of the pedal box, taken generally from the same side of that of FIG. 7, showing the final stage of pedal collapse.

At this stage, the brake pedal 14 is freed for collapse. It can rotate pivotally around a clevis pin 42 which connects it to an output member, and during that rotation the main pivot shaft moves to the far end of the aligned arcuate slots 30. Because the distance between a footpad portion 45 of the brake pedal 14 and the clevis pin 42 is a multiple of the distance between the clevis pin 42 and the main pivot shaft 12, the linear movement of the portion 45 during pedal collapse is a corresponding multiple of the arcuate length of the slots 30. FIG. 8 shows the relative positions 45a of the footpad portion of the brake pedal before collapse and 45b after collapse. The total collapse movement from 45a to 45b can be of the order of 80 to 120 mm. The extent of the pedal collapse can, however, be accurately controlled by limiting the arcuate extent of the slots 30, and can be engineered such that even after a severe front-end impact of the vehicle, full depression of the brake pedal can still be effective in applying the vehicle brakes.

FIGS. 9 to 12 show a brake pedal, blocking plate and latch member of a modified pedal box according to the invention. All other components of the modified pedal box are as illustrated in FIGS. 1 to 8, and are therefore omitted simply to avoid repetition. The same reference numerals as used above have been used wherever possible in FIGS. 9 to 12 to identify identical or equivalent parts.

Figure 9:
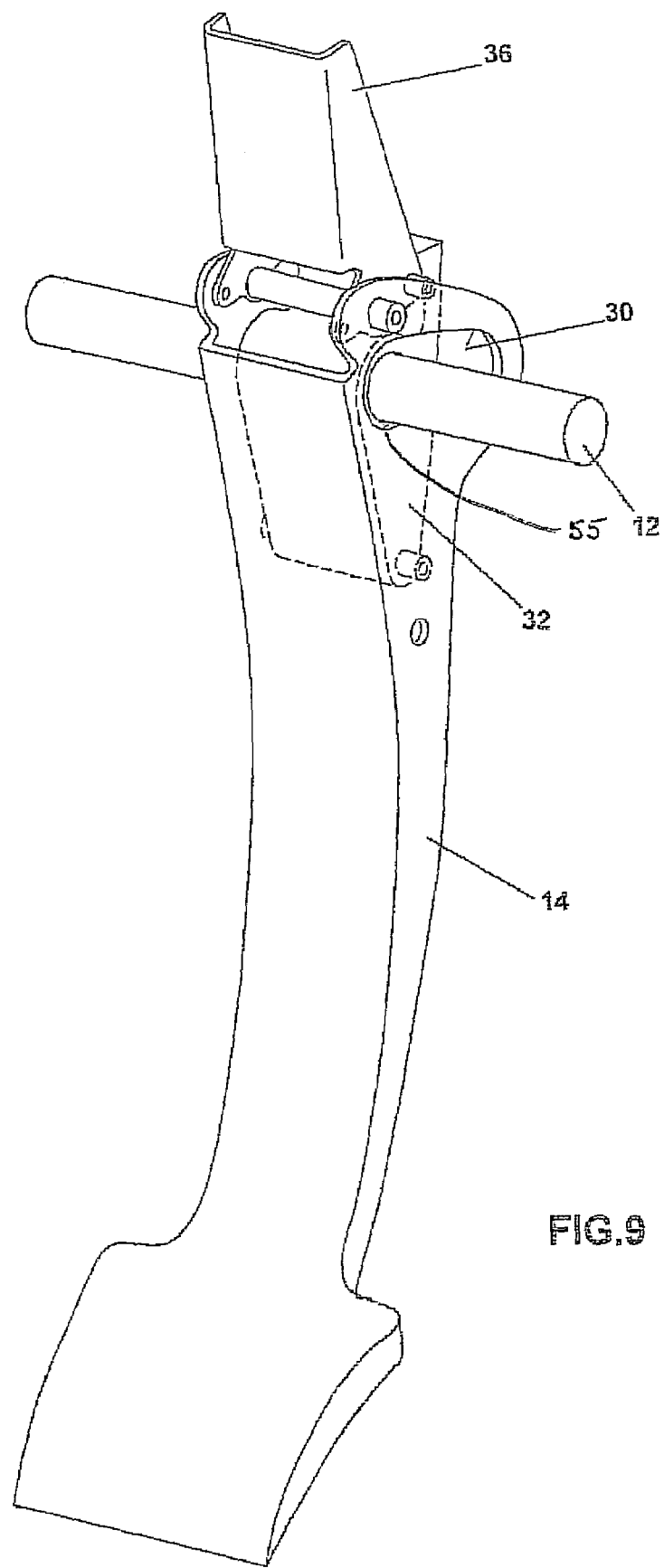
FIG. 9 is a perspective view of a modified pedal, blocking member and latch member only of a pedal box according to the invention.

FIG. 9 shows a brake pedal 14 pivotably mounted on a main pivot shaft 12. The pivot shaft 12 passes through an arcuate slot 30 in each side wall of the pedal 14, but is held at the left-hand end of the slots 30 by a blocking plate 32 which has a cylindrical aperture 55 therein providing a journal portion surrounding the pivot shaft 12. A latch member 36 holds the blocking plate 32 in position and prevents pedal collapse.

Figure 10:
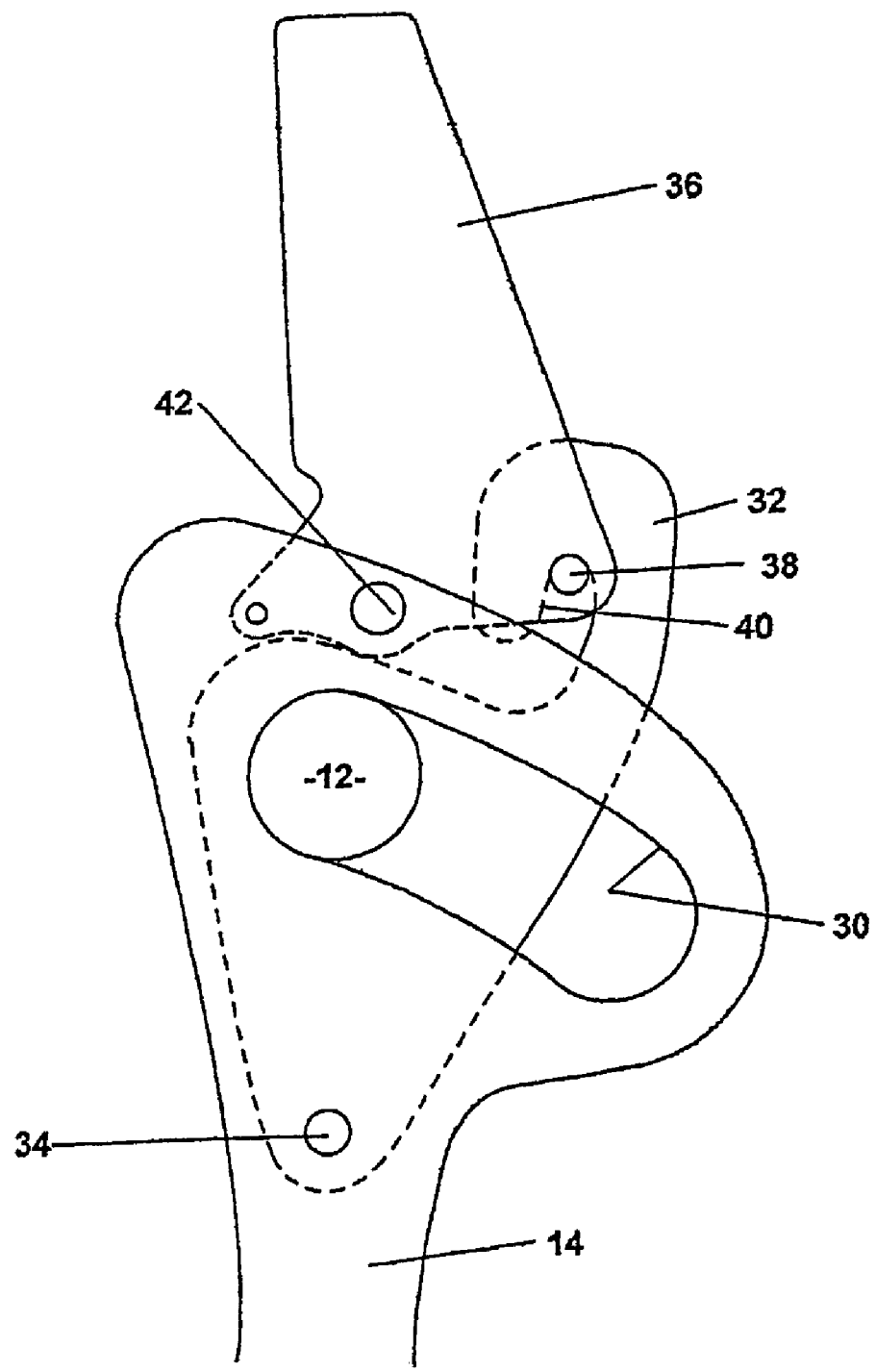
FIG. 10 is an enlarged side view detail of FIG. 9, showing the blocking plate holding the main pivot shaft at one end of an arcuate slot in the pedal in the normal operating position.

FIG. 10 shows the arrangement in more detail. The latch member 36 is located between the two sides of the pedal 14 and is pivotally mounted on the pedal 14 by a pivot pin 42. A detent pin 38 of the latch member 36 engages in a hooked recess 40 in the blocking plate 32, holding the entire assembly of pedal 14, blocking plate 32 and latch member 36 rigid but pivotable about the pivot shaft 12 to effect vehicle braking.

Figure 11:
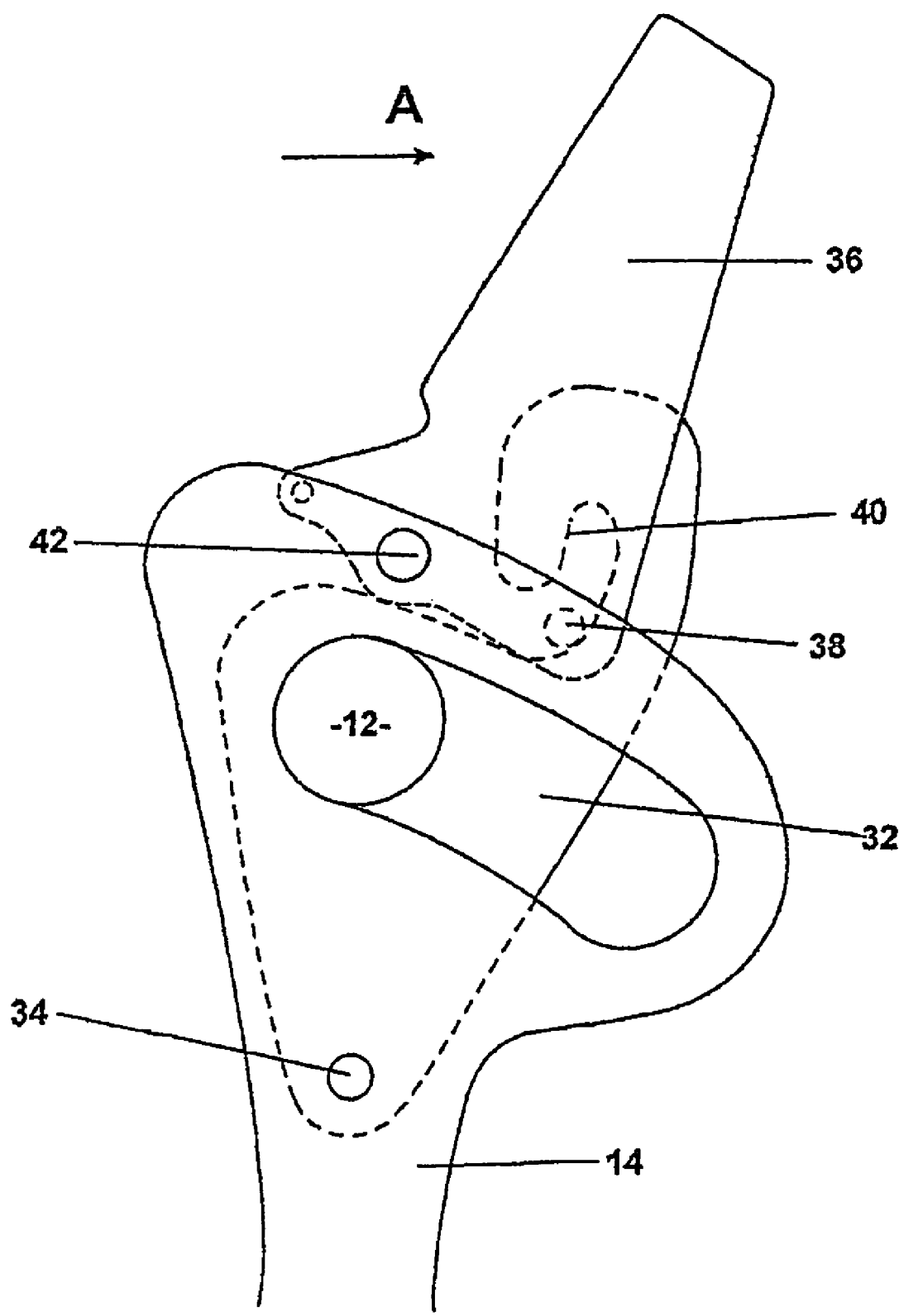
FIG. 11 is a side view similar to that of FIG. 10 but showing the transient condition in which a vehicle front-end impact has caused the latch member to release the blocking plate.

FIG. 11 illustrates the instant of latch release following a vehicle front-end impact. A relatively rigid member (not shown) in the driver's compartment of the vehicle strikes the latch member 36 in the direction of the arrow A in the case of such an impact, rotating the latch member 36 clockwise about the pivot pin 42 until its detent pin 38 is released from the hooked recess 40 of the blocking plate 32. Following such release, pedal collapse can occur as shown in FIG. 12.

Figure 12:
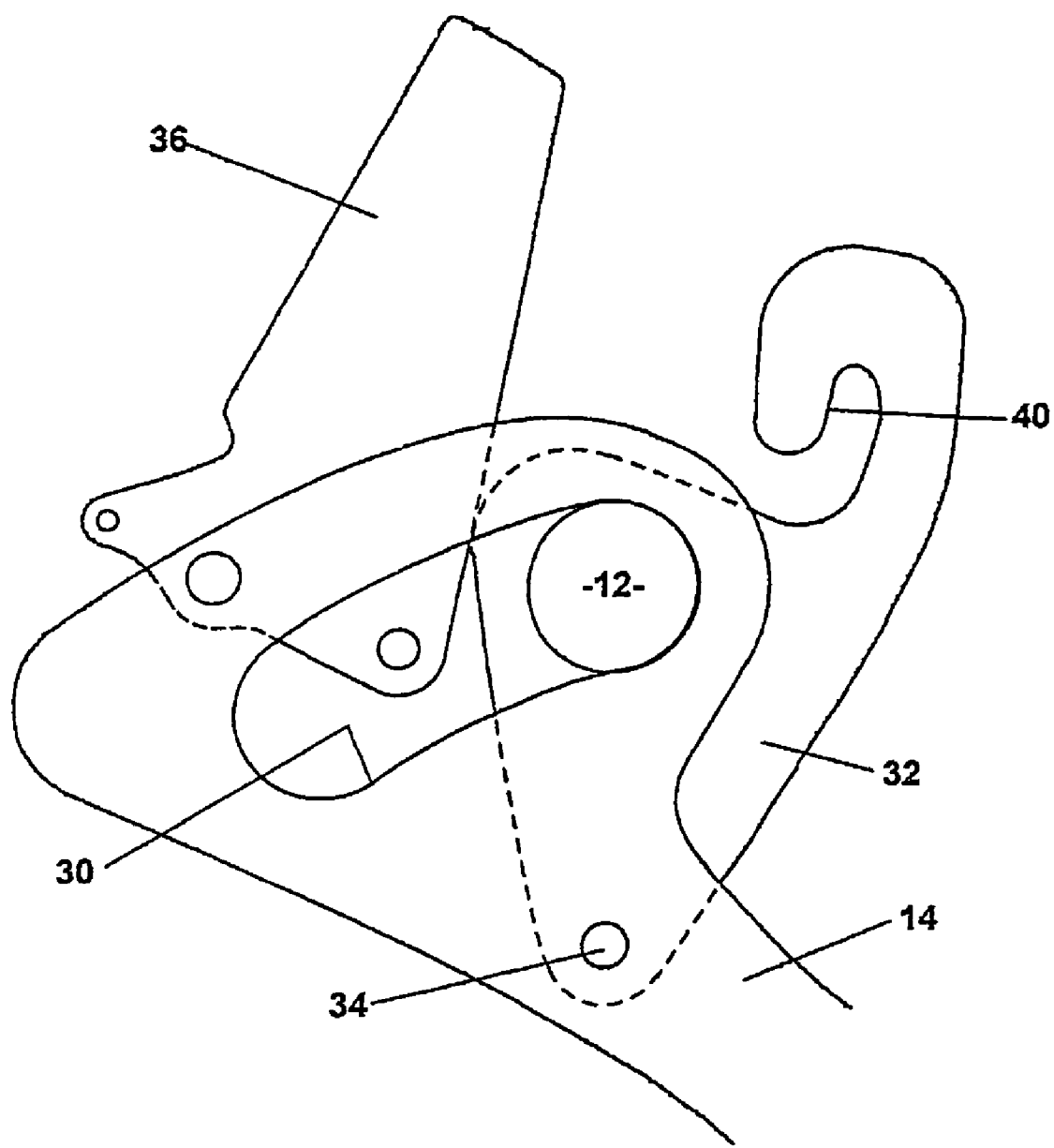
FIG. 12 is a similar side view showing the resultant pedal collapse.

FIG. 12 shows how the pivot pin 12 traverses the arcuate slot 30 following release of the blocking plate 32. The pedal 14 rotates anticlockwise as illustrated, away from the driver's feet, and is carried along the arcuate slot 30 by the blocking plate which is pivotally mounted by a pin 34 passing between opposite sides of the pedal 14. The arc of the slot 30 is centred around the axis of the pin 34.

The embodiment of FIGS. 9 to 12 illustrates a one-piece pedal 14, but a two-part pedal with an adjusting mechanism similar to that illustrated in FIGS. 1 to 8 could be used. The blocking plate 32 may be moulded from a strong, preferably fibre-reinforced, resin as in the embodiment of FIGS. 1 to 8. The fact that the blocking plate 32 has a cylindrical through-hole which acts as a journal for the main pivot shaft 12 reduces shaft wear and provides for a strong and reliable pivotal mounting for the pedal 14, even when the pedal is formed from pressed steel of generally U-shaped section comprising a front and two sides.

The invention claimed is:

1. A pedal box incorporating a control pedal of an automobile, wherein the pedal is pivotally mounted on a main pivot shaft which is held in a fixed position in the pedal box and which passes through an elongate slot in the pedal, the main pivot shaft being normally held at one end of the slot by a blocking plate which is held in position by a latch member in latching engagement with the blocking plate, the latching engagement maintained by a shear pin preventing rotation of the latch member, wherein when the pedal box is mounted in the automobile, which is involved in a frontal impact and causes a force to be applied to the shear pin breaking the shear pin allowing the latch member to disengage from the blocking plate releasing the blocking plate, permitting the blocking plate to fall away and allowing the main pivot shaft to traverse the slot in the pedal together with rotation of the pedal away from contact with the feet of a driver of the automobile.

2. A pedal box according to claim 1, wherein the blocking plate when held in position by the latch member abuts the main pivot shaft to hold the main pivot shaft at the said one end of the slot, so that when the blocking plate falls away following the frontal impact of the vehicle the blocking plate releases the main pivot shaft and allows the main pivot shaft to traverse the slot in the pedal.

3. A pedal box according to claim 1, wherein the blocking plate is pivotally mounted on the pedal.

4. A pedal box according to claim 3, wherein the mounting of the blocking plate on the pedal is provided by a pivotal axis for the blocking plate on one side of the elongate slot and latching engagement with the latch member on the other side of the elongate slot, so that when the latching engagement is released, the blocking plate falls away in a pivotal movement about its pivotal axis.

5. A pedal box according to claim 1, wherein the elongate slot is linear.

6. A pedal box according to claim 1, wherein the pedal is a two-part pedal comprising a fulcrum portion and a lever portion depending from the fulcrum portion, the lever portion moveably adjustable relative to the fulcrum portion.

7. A pedal box according to claim 6, wherein the fulcrum portion of the pedal includes a track receiving the lever portion wherein the lever portion is adjustable in the track changing the effective position of a foot-engaging portion of the pedal adjusting to different leg lengths of different drivers.

8. A pedal box according to claim 6, wherein the pedal portions are made from cut sections of an extruded aluminum alloy.

9. A pedal box according to claim 1, wherein the elongate slot is arcuate.

* * * * *